(12) United States Patent
Grussing

(10) Patent No.: US 8,932,678 B2
(45) Date of Patent: Jan. 13, 2015

(54) COMPOSITION COMPRISING SUPERABSORBENT POLYMER

(75) Inventor: Jeffrey F. Grussing, Trevor, WI (US)

(73) Assignee: United States Gypsum Company, Washington, DC (US)

( * ) Notice: Subject to any disclaimer, the term of this patent is extended or adjusted under 35 U.S.C. 154(b) by 34 days.

(21) Appl. No.: 13/525,550

(22) Filed: Jun. 18, 2012

(65) Prior Publication Data

US 2013/0337175 A1    Dec. 19, 2013

(51) Int. Cl.
| | | |
|---|---|---|
| C09D 103/00 | (2006.01) |
| C08K 3/26 | (2006.01) |
| B05D 1/28 | (2006.01) |
| B05D 1/26 | (2006.01) |
| B05D 3/00 | (2006.01) |
| B05D 1/02 | (2006.01) |

(52) U.S. Cl.
USPC ........ 427/256; 427/385.5; 427/393; 524/425; 524/47; 524/52; 524/53

(58) Field of Classification Search
CPC .......... C09D 103/00; C08K 3/26; B05D 1/28; B05D 1/26; B05D 3/00; B05D 1/02
USPC .................. 254/47, 425, 42, 52, 53; 427/256, 427/385.5, 393; 524/425, 42, 52, 53
See application file for complete search history.

(56) References Cited

U.S. PATENT DOCUMENTS

| | | | |
|---|---|---|---|
| 4,130,440 A | 12/1978 | Nose et al. | |
| 5,340,392 A | 8/1994 | Westbrook et al. | |
| 5,674,929 A | 10/1997 | Melbye | |
| 6,483,971 B2 | 11/2002 | Gaillard et al. | |
| 6,645,291 B2 | 11/2003 | Ayambem et al. | |
| 7,291,300 B2 | 11/2007 | Chhabra et al. | |
| 7,469,510 B2 | 12/2008 | Colbert et al. | |
| 7,491,755 B2 | 2/2009 | Bayer et al. | |
| 7,846,480 B2 | 12/2010 | Gilo et al. | |
| 7,886,499 B2 | 2/2011 | Okuda et al. | |
| 2003/0035917 A1* | 2/2003 | Hyman ............... | 428/67 |
| 2003/0084633 A1 | 5/2003 | Zuber et al. | |
| 2003/0144386 A1 | 7/2003 | Pakusch et al. | |
| 2003/0153651 A1 | 8/2003 | Bonetto et al. | |
| 2005/0032967 A1 | 2/2005 | Roberts, Sr. et al. | |
| 2008/0305252 A1 | 12/2008 | Cimaglio et al. | |
| 2012/0165426 A1 | 6/2012 | Hargrove et al. | |

FOREIGN PATENT DOCUMENTS

| | | |
|---|---|---|
| DE | 102007027477 | 1/2009 |
| EP | 0614954 | 9/1994 |
| EP | 1772500 | 4/2007 |
| EP | 2241178 A1 * | 10/2010 |
| WO | WO 02/06183 A1 | 1/2002 |

OTHER PUBLICATIONS

ADM, "Paygel 290 Pregalatinized Wheat Starch Product Data Sheet" Jan. 2010, 1 page, ADM, Keokuk, IA, USa.
Buchholz, F.L., "Development: Keeping Dry with Superabsorbent Polymers," Chemtech 24:9, Sep. 1994, Abstract p. 1, 24:9, Dow Chemical Co. (Midland: MI: United States).
Emsland Group, "Emcol UK-N", Dec. 2007, 1 page, Emsland-Stärke GmbH, Emlichheim, Germany.
MGP Ingredients, Inc., "Pregel Adhere 2000", Jul. 23, 2002, 1 page.
MGP Ingredients, Inc., "Pregel 10", Sep. 1, 2010, 1 page.
Tate & Lyle, "Starmic 105", Material Safety Data Sheet, Jul. 13, 2009, 5 pages, Tate & Lyle, Decatur, IL, USA.
Tate & Lyle, "Staramic 747", Material Safety Data Sheet, Dec. 22, 2010, 5 pages, Tate & Lyle, Decatur, IL, USA.
Tate & Lyle, "STAR*POL® 136 Starch Polymer" Technical Data Sheets, TDS 535, Feb. 1998, 5 pages, Tate & Lyle Decatur, IL, US.
European Patent Office International Search Report and Written Opinion from PCT/US2013/044911 (Sep. 17, 2013).

* cited by examiner

Primary Examiner — Michael M Bernshteyn
(74) Attorney, Agent, or Firm — Leydig Voit & Mayer, Ltd.; Philip T. Petti; Pradip K. Sahu

(57) ABSTRACT

Disclosed is a composition (e.g., a texture composition) comprising, consisting of, or consisting essentially of calcium carbonate and superabsorbent polymer that can absorb at least about 50 times its mass and having a particle size of about 250 microns or less, wherein the composition is substantially free of a setting-type cementitious material. In some embodiments, cellulosic thickener content is reduced or eliminated from the texture composition. Also disclosed is a method of finishing a substrate comprising applying to the surface a wet composition comprising, consisting of, or consisting essentially of calcium carbonate and superabsorbent polymer that can absorb at least about 50 times its mass and having a particle size of about 250 microns or less, wherein the composition is substantially free of a setting-type cementitious material, and drying the composition on the substrate.

19 Claims, No Drawings

COMPOSITION COMPRISING SUPERABSORBENT POLYMER

BACKGROUND OF THE INVENTION

Texture compositions are known for finishing substrates such as wallboard, plaster wall, concrete walls, ceilings, and the like. For example, the texture composition can be used to hide minor surface imperfections (e.g., covering joint compound application, or the like), or to create an aesthetic appearance. For example, the aesthetic appearance can be a smooth surface, a rough surface, and/or a three-dimensional surface, and can form a pattern if desired. The pattern can include, for example, spots, dots, patches, or three dimensional appearance such as a popcorn-type, aggregate surface such as for ceilings. The texture composition is applied wet so that it is workable to allow the desired appearance to be formed by a user. The applied wet texture composition is allowed to dry to finish the substrate.

The texture composition normally comprises a mineral, such as calcium carbonate, a cellulosic thickener, and other conventional materials. However, the use of cellulosic thickener in texture compositions has not been fully satisfactory. For example, it has been found in accordance with embodiments of the present invention that cellulosic thickeners are susceptible to entraining air into the system upon addition of water, which is undesirable because it can lead to an unsightly pinhole type structure in use. It has also been found in accordance with embodiments of the present invention that cellulosic thickeners can also cause the formulation to be undesirably runny upon application, which compromises the workability of the composition. Furthermore, cellulosic thickeners are generally expensive and add considerable cost in manufacturing texture compositions.

Thus, there is a need for an improved texture composition, such as one which reduces or eliminates air entrainment and/or the need for cellulosic thickener.

It will be appreciated that this background description has been created by the inventor to aid the reader, and is not to be taken as a reference to prior art nor as an indication that any of the indicated problems were themselves appreciated in the art.

BRIEF SUMMARY OF THE INVENTION

In one aspect, the invention provides a composition (e.g., a texture composition) comprising, consisting of, or consisting essentially of non-setting mineral such as calcium carbonate, insoluble calcium sulfate anhydrite, or the like, and superabsorbent polymer that can absorb at least about 50 times its mass and having a particle size of about 250 microns or less, wherein the composition is substantially free of a setting-type cementitious material.

In another aspect, the invention provides a texture composition consisting essentially of calcium carbonate in an amount from about 30% to about 95% by weight of the dry composition, superabsorbent polymer that can absorb at least about 50 times its mass and having a particle size of less than about 250 microns, wherein the superabsorbent polymer is in an amount from about 0.02% to about 5% by weight of the dry composition, and starch.

In another aspect, the invention provides a method of texturing a substrate comprising the steps of applying to the substrate a wet composition comprising, consisting of, or consisting essentially of non-setting mineral such as calcium carbonate, insoluble calcium sulfate anhydrite, or the like, and superabsorbent polymer that can absorb at least about 50 times its mass and having a particle size of less than about 250 microns, wherein the composition is substantially free of a setting-type cementitious material, and allowing the composition to dry on the substrate in a desired textured appearance.

DETAILED DESCRIPTION OF THE INVENTION

The present invention is premised, at least in part, upon the surprising and unexpected discovery of a composition (e.g., texture composition) that comprises a superabsorbent polymer and a non-setting type mineral such as calcium carbonate. The texture composition is applied in wet form to a substrate. The superabsorbent polymer has been discovered to surprisingly and unexpectedly improve texture compositions by holding considerable water as desired while reducing or eliminating the problem of air entrainment upon addition of water. The water holding property of compositions according to embodiments of the invention desirably improve the workability and consistency of the composition upon addition of water to facilitate application of the composition, e.g., to a substrate. Without adequate water holding, the composition can be less workable and can be difficult to spray properly or otherwise apply. Advantageously, embodiments of the invention can limit or exclude the use of cellulosic thickeners which heretofore have not been fully satisfactory when used in texture compositions.

Embodiments of the texture composition harden upon drying the composition by evaporation of water. Compositions according to the invention do not require a chemical reaction to occur as is the case with setting-type materials. Accordingly, embodiments of the composition include material, such as mineral, that cures simply by drying as opposed to setting, and preferably substantially exclude setting materials such as hydraulically setting materials. Thus, the texture compositions of the invention are desirably substantially free of calcined gypsum (i.e., calcium sulfate hemihydrate) or other setting-type material such as cement. As used herein, "substantially free" of such setting-type material means that the composition contains 0 wt. % based on the weight of the composition, or no such setting material, or an ineffective or immaterial amount of such setting material. An example of an ineffective amount is an amount below the threshold amount to achieve the intended purpose of using such setting material, as one of ordinary skill in the art will appreciate. An immaterial amount may be, e.g., about 10% or less, about 5% or less, about 2% or less, about 1% or less, about 0.5% or less, or about 0.1% or less, based on the weight of the composition, depending on the ingredient, as one of ordinary skill in the art will appreciate.

In some embodiments, the texture composition is packaged in dry form. In such embodiments, the user is required to add water in the field, e.g., at a job site. Thus, some embodiments of the invention are packaged substantially free of water. One of ordinary skill in the art will appreciate that "substantially free of water" means that the composition is packaged as a "dry" type product including little or no water such that the end user would need to add water in the field to desired viscosity to use the composition. For example, in some embodiments, there is zero water or an amount less than about 1% by weight of the composition.

However, it is contemplated that some embodiments can include water to form a "ready-mixed" type of product as one of ordinary skill in the art will appreciate. In such ready-mixed type of products according to the invention, the water is present in an amount from about 20% to about 60% by weight of the wet composition, such as from about 25% to about 50% by weight of the wet composition, or from about 30% to about 45% by weight of the wet composition. In some embodiments, a viscosity stabilizer such as magnesium hydroxide or the like is included, for example, in ready-mixed embodiments, e.g., in an amount from about 0.01% to about 5.0% by weight of the dry composition. Preparation (but not the formulation) of "dry" or "ready-mixed" compositions in accordance with the invention is well within the level of ordinary skill in the art. Dry product is made by dry mixing the ingredients in a suitable order, whereas ready-mixed product requires addition of water and mixing prior to packaging, normally in an air tight package to maintain the product in wet form during shipment and storage.

The texture composition according to the invention is formulated so that, upon addition of water, the viscosity allows for suitable workability. For example, the viscosity of the wet texture composition is selected to allow the desired aesthetic appearance to be formed, particularly depending on the mode of application, as discussed herein. The viscosity can be, e.g., as listed in Table 1 below. In the table, an "X" represents the range "from about [corresponding value in first row] to about [corresponding value in first column]." For ease of presentation, it will be understood that each value represents "about" that value. The units are Brabender units as discussed below. For example, the first "X" is the range "from about 150 Brabender units to about 200 Brabender units."

TABLE 1

|     | 150 | 200 | 250 | 300 | 350 | 400 | 450 | 500 | 600 | 700 |
|-----|-----|-----|-----|-----|-----|-----|-----|-----|-----|-----|
| 200 | X   |     |     |     |     |     |     |     |     |     |
| 250 | X   | X   |     |     |     |     |     |     |     |     |
| 300 | X   | X   | X   |     |     |     |     |     |     |     |
| 350 | X   | X   | X   | X   |     |     |     |     |     |     |
| 400 | X   | X   | X   | X   | X   |     |     |     |     |     |
| 450 | X   | X   | X   | X   | X   | X   |     |     |     |     |
| 500 | X   | X   | X   | X   | X   | X   | X   |     |     |     |
| 600 | X   | X   | X   | X   | X   | X   | X   | X   |     |     |
| 700 | X   | X   | X   | X   | X   | X   | X   | X   | X   |     |
| 800 | X   | X   | X   | X   | X   | X   | X   | X   | X   | X   |

Thus, the viscosity can have a range between and including any aforementioned endpoints. Ready-mixed compositions can be packaged with viscosity at the higher end of the range with further water dilution performed by the user as desired. For example, in some embodiments, packaged ready-mixed compositions can have a viscosity above about 450 Brabender units, e.g., from about 450 to about 800 Brabender units, from about 500 to about 800 Brabender units, or from about 500 to about 600 Brabender units.

One of ordinary skill in the art will readily recognize Brabender units. For example, briefly, a C.W. Brabender viscosimeter can be used, e.g., a Visco-Corder® that uses reaction torque for dynamic measurement. The Visco-Corder® is commercially available from C.W. Brabender Instruments, Inc., Hackensack, N.J. It is to be noted that, as defined herein, the Brabender units are measured using a sample cup size of 8 fl. oz (≈240 cc), with a 250 cm-gm cartridge at an RPM of 75, as described in the Brabender product manual for Visco-Corder® (5M/10-79/#79/13), incorporated herein by reference. The "B" narrow double flag style paddle is used for dry mix product while the pin style "A" paddle is used for ready-mixed product as packaged which is normally more viscous, although the "B" style paddle can be used upon further dilution of ready-mixed product. One of ordinary skill in the art also will readily recognize that the Brabender units can be converted to other viscosity measurements, such as centipoise or Krebs units, as described therein.

Texture compositions according to the invention can be used to hide imperfections and/or provide a decorative finish, as desired, to a substrate. The substrate can be any suitable substrate, such as, for example, all or part of a wallboard, plaster wall, concrete, or ceiling surface. The texture composition can be applied so that the resulting surface is smooth, or rough, and in some embodiments can be used to form a three-dimensional surface. For example, in some embodiments, joint compound is separately applied in the joint between two pieces of wallboard, to fill holes and/or over screw or nail heads. The texture composition can be applied over the resulting joint compound pattern to form an aesthetically pleasing surface, as desired, to hide the joint compound surface and other underlying imperfections. As another example, in some embodiments, the texture composition can be used to form a popcorn or aggregate style surface such as for a ceiling.

The mode of application may vary, for example, depending on the decorative or aesthetic appearance that is desired. Normally, the desired application is performed so that the texture composition sufficiently adheres to the substrate but does not require the spreadability and hot and cold bond required in other products such as joint compound. For example, in some embodiments, the texture composition is applied by spraying, which will be understood as an efficient manner of application requiring lower labor expenditure. In some embodiments, the viscosity of sprayable formulations is normally lower than the viscosity of those intended to be applied in a different manner (e.g., from about 150 to about 300 Brabender units, such as from about 175 to about 300 Brabender units, about 175 to about 275 Brabender units, about 175 to about 250 Brabender units, about 175 to about 225 Brabender units, about 175 to about 200 Brabender units, about 200 to about 300 Brabender units, about 200 to about 275 Brabender units, about 200 to about 250 Brabender units, about 200 to about 225 Brabender units, about 225 to about 300 Brabender units, about 225 to about 275 Brabender units, about 225 to about 250 Brabender units, about 250 to about 300 Brabender units, about 250 to about 275 Brabender units, or about 275 to about 300 Brabender units). Other viscosities as described herein are also contemplated.

Other modes of application include stippling, for example, with a paintbrush, to form a desired pattern such as a decorative appearance having dots, spots, or the like. In some embodiments, a roll-on technique may be used, such as with a paint roller. In some embodiments employing these modes of application, the viscosity of the composition may be the same as the viscosities listed for sprayable formulations or in other ranges as described herein. For example, in some embodiments, e.g., where the mode of application is by stippling, a more viscous texture composition may be desired, such as above about 300 Brabender units in the ranges provided herein.

Desired mineral in accordance with embodiments of the invention cure by drying and are not setting-type materials such as calcined gypsum, cement, or other hydraulically setting materials. In embodiments of the invention, calcium carbonate and/or insoluble calcium sulfate anhydrite are desirable because they are dense, inert, non-setting materials that can be included as mineral in the texture composition. The non-setting mineral is present in a suitable amount to impart structure to the composition (e.g., about 30% to about 95% by weight of the composition). For example, in some embodiments, the composition comprises less than about 50% by weight of non-setting mineral (e.g., about 30% to about 50% by weight, about 30% to about 45% by weight, or about 30% to about 40% by weight) such as for sprayable compositions. In other embodiments, the non-setting mineral, such as calcium carbonate and/or insoluble calcium sulfate anhydrite, is in an amount of at least about 50% by weight of the composition. For example, in embodiments of the invention, the non-setting mineral is in an amount from about 50% to about 95% by weight of the composition, such as an amount from about 65% to about 95% by weight of the composition, an amount from about 70% to about 95% by weight of the composition, an amount from about 70% to about 90% by weight of the composition, an amount from about 70% to about 85% by weight of the composition, an amount from about 70% to about 80% by weight of the composition, an amount from about 75% to about 95% by weight of the composition, an amount from about 75% to about 90% by weight of the composition, an amount from about 75% to about 85% by weight of the composition, an amount from about 80% to about 95% by weight of the composition, or an amount from about 80% to about 90% by weight of the composition.

Calcium carbonate, insoluble calcium sulfate anhydrite, and other non-setting, inert minerals often do not naturally form a sprayable or workable material when in an aqueous mix. Superabsorbent polymer in accordance with the invention is included in the composition for water retention so that the composition can be sprayed or otherwise applied and worked, e.g., via roller, stippling, etc. In addition, the superabsorbent polymer also adds bond properties to allow the material to adhere to the substrate surface. Surprisingly and unexpectedly, the superabsorbent polymer in accordance with the invention is useful as a water holding agent while reducing the entrainment of air into the composition and the mobility of the wet composition when applied. Advantageously, the superabsorbent polymer according to embodiments of the invention may be used to replace or reduce the use of cellulosic thickener. In some embodiments, the superabsorbent polymer is able to absorb at least about 50 times its own mass. For example, in various embodiments, the superabsorbent polymer is able to absorb from about 50 to about 800 times its mass, about 100 to about 700 times its mass, about 150 to about 600 times its mass, about 150 to about 500 times its mass, about 150 to about 400 times its mass, about 150 to about 300 times its mass, about 150 to about 250 times its mass, about 200 to about 400 times its mass, about 200 to about 350 times its mass, about 200 to about 300 times its mass, about 200 to about 250 times its mass, about 250 to about 350 times its mass, or about 250 to about 300 times its mass. In some embodiments, superabsorbent polymers that possess smaller ratios of absorption relative to own mass are excluded. For example in some embodiments, superabsorbent polymers that absorb less than about 15 times its mass, less than about 25 times its mass, less than about 35 times its mass, or less than about 50 times its mass are excluded.

In some embodiments, the superabsorbent polymer is selected to have a fine average particle size, such as about 250 microns (diameter) or less. In some embodiments, the average particle size is about 200 microns or less, about 175 microns or less, about 150 microns or less, about 100 microns or less, or about 75 microns or less, such as, for example, the following ranges in various embodiments: about 50 microns to about 75 microns, about 50 microns to about 100 microns, about 50 microns to about 150 microns, about 50 microns to about 200 microns, about 50 microns to about 250 microns, about 70 microns to about 80 microns, about 70 microns to about 100 microns, about 70 microns to about 150 microns, about 70 microns to about 200 microns, about 70 microns to about 250 microns, about 100 microns to about 150 microns, about 100 microns to about 200 microns, about 100 microns to about 250 microns, about 150 microns to about 200 micron, about 150 microns to about 250 microns, or about 200 microns to about 250 microns.

In some embodiments, about 98%, or alternatively about 99%, of the particles would pass through a mesh screen, as recognized by the ordinary artisan, ranging from about 60 to about 300 mesh. For example, in embodiments of the invention, about 98% of the particles of the superabsorbent polymer would pass through a 75 mesh screen, about 98% of the particles of the superabsorbent polymer would pass through a 100 mesh screen, about 98% of the particles of the superabsorbent polymer would pass through a 125 mesh screen, about 98% of the particles of the superabsorbent polymer would pass through a 150 mesh screen, about 98% of the particles of the superabsorbent polymer would pass through a 175 mesh screen, about 98% of the particles of the superabsorbent polymer would pass through a 200 mesh screen, about 98% of the particles of the superabsorbent polymer would pass through a 225 mesh screen, about 98% of the particles of the superabsorbent polymer would pass through a 250 mesh screen, about 98% of the particles of the superabsorbent polymer would pass through a 275 mesh screen, or about 98% of the particles of the superabsorbent polymer would pass through a 300 mesh screen. In some embodiments, about 99% of the particles pass through each of the noted mesh screens.

The superabsorbent polymer is selected to meet the desired properties noted herein. In some embodiments, the superabsorbent polymer is prepared from the polymerization of acrylic acid blended with sodium hydroxide in the presence of an initiator to form a poly-acrylic acid sodium salt. In some embodiments, the superabsorbent polymer is made from polyacrylamide copolymer, ethylene maleic anhydride copolymer, cross-linked carboxy-methylcellulose, polyvinyl alcohol copolymers, cross-linked polyethylene oxide, and starch grafted copolymer of polyacrylonitrile. For example, in some embodiments, the superabsorbent polymer is in the form of starch grafted polyacrylamide. One example of a useful superabsorbent polymer is Water Lock®, which has been commercially available from Grain Processing of Muscatine, Iowa.

Advantageously, it has been found that the superabsorbent polymer can be used in relatively small amounts (e.g., from about 0.02% to about 5% by weight of the composition, such as from about 0.02% to about 2%) and still achieve the desired properties, such as water retention. In embodiments of the invention, the amount of the superabsorbent polymer can be, e.g., as listed in Table 2 below. In the table, an "X" represents the range "from about [corresponding value in first row] to about [corresponding value in first column]." The indicated values represent percentage by weight of the composition. For ease of presentation, it will be understood that each value represents "about" that value. For example, the first "X" is the range "from about 0.02% by weight of the composition to about 0.035% by weight of the composition."

TABLE 2

|       | 0.02 | 0.035 | 0.1 | 0.5 | 0.75 | 1 | 1.25 | 1.5 | 1.75 | 2 | 2.25 | 2.5 | 2.75 | 3 | 4 |
|-------|------|-------|-----|-----|------|---|------|-----|------|---|------|-----|------|---|---|
| 0.035 | X    |       |     |     |      |   |      |     |      |   |      |     |      |   |   |
| 0.1   | X    | X     |     |     |      |   |      |     |      |   |      |     |      |   |   |
| 0.5   | X    | X     | X   |     |      |   |      |     |      |   |      |     |      |   |   |
| 0.75  | X    | X     | X   | X   |      |   |      |     |      |   |      |     |      |   |   |
| 1     | X    | X     | X   | X   | X    |   |      |     |      |   |      |     |      |   |   |
| 1.25  | X    | X     | X   | X   | X    | X |      |     |      |   |      |     |      |   |   |
| 1.5   | X    | X     | X   | X   | X    | X | X    |     |      |   |      |     |      |   |   |
| 1.75  | X    | X     | X   | X   | X    | X | X    | X   |      |   |      |     |      |   |   |
| 2     | X    | X     | X   | X   | X    | X | X    | X   | X    |   |      |     |      |   |   |
| 2.25  | X    | X     | X   | X   | X    | X | X    | X   | X    | X |      |     |      |   |   |
| 2.5   | X    | X     | X   | X   | X    | X | X    | X   | X    | X | X    |     |      |   |   |
| 2.75  | X    | X     | X   | X   | X    | X | X    | X   | X    | X | X    | X   |      |   |   |
| 3     | X    | X     | X   | X   | X    | X | X    | X   | X    | X | X    | X   | X    |   |   |
| 4     | X    | X     | X   | X   | X    | X | X    | X   | X    | X | X    | X   | X    | X |   |
| 5     | X    | X     | X   | X   | X    | X | X    | X   | X    | X | X    | X   | X    | X | X |

Thus, the amount of the superabsorbent polymer can have a range between and including any aforementioned endpoints.

As noted, it is surprising and unexpected that the texture composition with superabsorbent polymer has a desirable water retention property but is significantly less susceptible to air entrainment than conventional formulations containing cellulosic thickener. Because of the reduction in air entrainment, unwanted pinholes in the applied product are greatly reduced or eliminated. Furthermore, it has been found in accordance with the invention that whereas cellulosic thickeners cause the formulation to be undesirably mobile and runny, and can cause unwanted dripping (e.g., due to gravity), the superabsorbent polymer allows for a much more workable composition with reduced mobility since the composition is less apt to be runny or to drip. In addition, texture compositions with superabsorbent polymer in accordance with embodiments of the invention are easier to handle, since the material is less sticky and easier to wash off from hands and tools, especially in comparison to conventional formulations including cellulosic thickener.

Accordingly, some embodiments of the present invention advantageously allow exclusion or reduction in some additives. For example, the composition can reduce or eliminate cellulosic thickener. Examples of types of cellulosic thickener include, e.g., oligosaccharide, polysaccharide, cellulosic ether, cellulose-based gum, methyl cellulose, hydroxyethyl cellulose, hydroxyethylmethyl cellulose, dextran, carboxymethyl dextran, dextran-sulfonate salt, chitosan, xanthan gum, carboxymethyl cellulose or a salt thereof, carrageenan, hydroxyethylhydroxypropyl cellulose, ethylhydroxyethyl cellulose, hydroxypropylmethyl cellulose, and methylhydroxylpropyl cellulose (e.g., Bermocoll, Akzo Nobel). As used herein, "substantially free" of cellulosic thickener means that the composition contains 0 wt. % based on the weight of the composition, or no cellulosic thickener, or an ineffective or immaterial amount of cellulosic thickener. An example of an ineffective amount is an amount below the threshold amount to achieve the intended purpose of using the cellulosic thickener, as one of ordinary skill in the art will appreciate. An immaterial amount may be, e.g., about 0.1% or less, about 0.05% or less, about 0.01% or less, about 0.005% or less, or about 0.001% or less, based on the weight of the composition, depending on the ingredient, as one of ordinary skill in the art will appreciate.

Similarly, in some embodiments, defoamer content can be reduced or eliminated since the use of superabsorbent polymer and reduction or elimination of cellulosic thickener reduces or eliminates any problem with air entrainment since defoamer is normally included to subdue air entrainment. As used herein, "substantially free" of defoamer means that the composition contains 0 wt. % based on the weight of the composition, or no defoamer, or an ineffective or immaterial amount of defoamer. An example of an ineffective amount is an amount below the threshold amount to achieve the intended purpose of using the defoamer as one of ordinary skill in the art will appreciate. An immaterial amount may be, e.g., about 0.01% or less, about 0.005% or less, or about 0.001% or less, based on the weight of the composition, depending on the ingredient, as one of ordinary skill in the art will appreciate. However, if desired in some embodiments, defoamer (e.g., Foamaster) can be included in the texture composition. If present, defoamer can be in an amount, for example, from about 0.01% to about 5%, such as from about 0.015% to about 0.05% by weight of the composition.

Clay can optionally be included in some texture composition embodiments. Examples of suitable clays include kaolin clay and attapulgite clay. Clay can be useful in some embodiments by enhancing the workability of the composition, such as by improving the body of the composition upon addition of water to thereby facilitate holding particles in suspension. Kaolin clay also has the added benefit of being a colorant for adding a white color, which may be useful in covering up imperfections or joint compound upon application. If present, the clay can be in an amount from about 1% by weight of the composition to about 20% by weight of the composition, such as from about 1% by weight of the composition to about 15% by weight of the composition. In some embodiments, the composition is substantially free of clay, such as kaolin clay or attapulgite clay (e.g., Minugel). As used herein, "substantially free" of clay means that the composition contains 0 wt. % based on the weight of the composition, or no clay, or an ineffective or immaterial amount of clay. An example of an ineffective amount is an amount below the threshold amount to achieve the intended purpose of using the clay as one of ordinary skill in the art will appreciate. An immaterial amount may be, e.g., about 1% or less, about 0.5% or less, about 0.1% or less, about 0.5% or less, about 0.01% or less, about 0.005% or less, or about 0.001% or less, based on the weight of the composition, depending on the ingredient, as one of ordinary skill in the art will appreciate.

In some embodiments, a starch can be included in the composition. The starch can be used to increase the bonding property of the composition upon addition of water. As such, the starch may improve the application of the texture composition by allowing the composition to adhere more suitably to the substrate as desired. Starches are not classified as cellulosic thickener in accordance with the present invention.

A suitable starch is selected based on its bond enhancing property. Examples of suitable sources for starch include corn starch, potato starch, or wheat starch. In some embodiments, the starch comprises pregelatinized starch, an acid modified starch or an alkylated starch, e.g., ethylated or propylated starch. For example, pregelatinized starch according to embodiments of the invention can be pregelatinized wheat starch (e.g., Paygel 290 by Archer Daniels Midland), including native wheat starch (e.g., Pregel 10 by MGP Ingredients, Inc.) or modified wheat starch (e.g., Pregel Adhere 2000 by MGP Ingredients, Inc.). Other alternative starches can be used. For example, in some embodiments, the starch can be cold water soluble, such as, for example, an alkylated starch such as hydroxyethylated dent corn starch (Staramic 747 by AE Stanley), hydroxypropylated cross-linked dent corn starch (e.g., Staramic 105 by AE Stanley), hydroxypropylated cross-linked waxy corn starch (e.g., Starpol 136 by AE Stanley), or a modified potato starch (e.g., Emcol UK-N by Emsland Group).

If present, the starch can be in an amount from about 0.5% by weight of the composition to about 10% by weight of the composition, such as from about 1% by weight of the composition to about 4% by weight of the composition. In some embodiments, the composition is substantially free of one or more starch (e.g., all). As used herein, "substantially free" of starch means that the composition contains 0 wt. % based on the weight of the composition, or no starch, or an ineffective or immaterial amount of starch. An example of an ineffective amount is an amount below the threshold amount to achieve the intended purpose of using the starch as one of ordinary skill in the art will appreciate. An immaterial amount may be, e.g., about 0.1% or less, about 0.05% or less, about 0.01% or less, about 0.005% or less, or about 0.001% or less, based on the weight of the composition, depending on the ingredient, as one of ordinary skill in the art will appreciate.

Gum can be included in some embodiments of the texture composition. In some embodiments, the composition is substantially free of a gum material. The gum can be used to enhance the consistency of the composition upon addition of water. For example, the gum can facilitate the spraying of the composition in spray modes of application. Examples of suitable gums include arabic gum, alginate gum, pectin gum, and guar gum (e.g., Galactasol). If present, the gum can be in an amount from about 0.03% by weight of the composition to about 1% by weight of the composition, such as from about 0.03% by weight of the composition to about 0.6% by weight of the composition. In some embodiments, the composition is substantially free of gum. As used herein, "substantially free" of gum means that the composition contains 0 wt. % based on the weight of the composition, or no gum, or an ineffective or immaterial amount of gum. An example of an ineffective amount is an amount below the threshold amount to achieve the intended purpose of using the gum as one of ordinary skill in the art will appreciate. An immaterial amount may be, e.g., about 0.01% or less, about 0.005% or less, or about 0.001% or less, based on the weight of the composition, depending on the ingredient, as one of ordinary skill in the art will appreciate.

If desired, non-setting filler material, such as mica can optionally be included in the texture composition. The filler material desirably can be less dense than the calcium carbonate. Mica is one useful example because its relatively low density is desirable and it is a relatively inexpensive material. If present, the filler can be in an amount from about 1% by weight of the composition to about 12% by weight of the composition, such as from about 2% by weight of the composition to about 10% by weight of the composition. It is also contemplated that in some embodiments, the composition is substantially free of filler such as mica. As used herein, "substantially free" of such filler material means that the composition contains 0 wt. % based on the weight of the composition, or no such filler material, or an ineffective or immaterial amount of such filler material. An example of an ineffective amount is an amount below the threshold amount to achieve the intended purpose of using such setting material, as one of ordinary skill in the art will appreciate. An immaterial amount may be, e.g., about 1% or less, about 0.5% or less, or about 0.1% or less, based on the weight of the composition, depending on the ingredient, as one of ordinary skill in the art will appreciate.

Optionally, biocide can be included as desired in some embodiments. Suitable biocides will be recognized by one of ordinary skill in the art. For example, Vancide (RT Vanderbilt) is an example of a suitable biocide. The biocide can be present in an amount from about 0.006% by weight of the composition to about 0.6% by weight of the composition.

Thus, in an embodiment, a composition, such as a texture composition, comprises calcium carbonate and superabsorbent polymer that can absorb at least about 50 times its mass and having a particle size of about 250 microns or less, wherein the composition is substantially free of a setting-type cementitious material.

In another embodiment, the superabsorbent polymer can absorb from about 50 to about 800 times its mass.

In another embodiment, the superabsorbent polymer can absorb from about 200 to about 800 times its mass.

In another embodiment, the superabsorbent polymer has a particle size of about 150 microns or less.

In another embodiment, the composition has a viscosity from about 200 to about 400 Brabender units upon addition of water.

In another embodiment, the superabsorbent polymer is present in an amount from about 0.02% to about 5% by weight of the composition.

In another embodiment, the superabsorbent polymer is prepared from the polymerization of acrylic acid blended with sodium hydroxide in the presence of an initiator to form a poly-acrylic acid sodium salt.

In another embodiment, the superabsorbent polymer is made from polyacrylamide copolymer, ethylene maleic anhydride copolymer, cross-linked carboxy-methylcellulose, polyvinyl alcohol copolymers, cross-linked polyethylene oxide, and starch grafted copolymer of polyacrylonitrile.

In another embodiment, the composition is substantially free of cellulosic thickener.

In another embodiment, the composition has a reduced amount of cellulosic thickener.

In another embodiment, the composition is substantially free of oligosaccharide, polysaccharide, cellulosic ether, cellulose-based gum, methyl cellulose, hydroxyethyl cellulose, hydroxyethylmethyl cellulose, dextran, carboxymethyl dextran, dextran-sulfonate salt, chitosan, xanthan gum, carboxymethyl cellulose or a salt thereof, carrageenan, hydroxyethylhydroxypropyl cellulose, ethylhydroxyethyl cellulose, hydroxypropylmethyl cellulose, and methylhydroxylpropyl cellulose.

In another embodiment, a filler material, such as mica, is included in the composition.

In another embodiment, viscosity stabilizer such as magnesium hydroxide can optionally be included, such as in ready-mixed embodiments that also include water.

In another embodiment, the composition includes biocide.

In another embodiment, the composition includes clay (e.g., attapulgite or kaolin), gum (e.g., arabic gum, alginate gum, pectin gum, and guar gum), and/or a starch, individually or in any combination.

In another embodiment, the composition includes pregelatinized starch, acid modified starch, or alkylated (e.g., ethylated or propylated) starch.

In another embodiment, the composition includes corn starch, potato starch, wheat starch, modified corn starch, pregelatinized wheat starch, native wheat starch, modified wheat starch, hydroxyethylated dent corn starch, hydroxypropylated cross-linked dent corn starch, hydroxypropylated cross-linked waxy corn starch or modified potato starch.

In another embodiment, the composition is substantially free of clay or has a reduced amount of clay.

In another embodiment, the composition is substantially free of attapulgite clay or kaolin clay, or has a reduced amount of attapulgite clay or kaolin clay.

In another embodiment, the composition is substantially free of starch and/or gum, or has a reduced amount of starch and/or gum.

In another embodiment, the composition is substantially free of pregelatinized starch, acid modified starch, and/or alkylated (e.g., ethylated or propylated) starch.

In another embodiment, the composition is substantially free of one or more (e.g., all) of the following starches: corn starch, potato starch, wheat starch, modified corn starch, pregelatinized wheat starch, native wheat starch, modified wheat starch, hydroxyethylated dent corn starch, hydroxypropylated cross-linked dent corn starch, hydroxypropylated cross-linked waxy corn starch or modified potato starch.

In another embodiment, the composition is substantially free of an arabic gum, alginate gum, pectin gum, and guar gum, or has a reduced amount of arabic gum, alginate gum, pectin gum, and guar gum.

In another embodiment, the composition further comprises water such as packaged in a ready-mixed product.

In another embodiment, the composition is a texture composition.

In another embodiment, a texture composition consists essentially of (a) calcium carbonate, (b) superabsorbent polymer that can absorb at least about 50 times its mass and having a particle size of about 250 microns or less, and (c) starch. The calcium carbonate can be, for example, in an amount from about 30% to about 95% by weight of the composition. The superabsorbent polymer can be, for example, in an amount from about 0.02% to about 5% by weight of the composition. In such embodiments, the composition precludes the inclusion of any compound other than the aforesaid calcium carbonate, superabsorbent polymer, and starch, that materially affects the inventive composition (e.g., compounds that exert a cellulosic thickening or setting effect when adding water). Thus, compounds that would be excluded in a composition consisting essentially of calcium carbonate, superabsorbent polymer that can absorb at least about 50 times its mass and having a particle size of less than about 250 microns, and starch, would include setting-type materials such as calcium sulfate hemihydrate and cement, as well as cellulosic thickener. Compounds that would not be excluded in a texture composition consisting essentially of calcium carbonate, superabsorbent polymer that can absorb at least about 50 times its mass and having a particle size of about 250 microns or less, and starch, are compounds that do not materially affect the texture composition, such as defoamers, fillers such as mica, clays, gums, preservatives, solvents and other additives (e.g., binders, alcohols, biocides, colorings), other non-setting mineral (e.g., insoluble calcium sulfate anhydrite), as well as other compounds that do not exert a setting or cellulosic thickening effect when in a wet texture composition.

In another embodiment, a method of texturing (finishing) a substrate comprises applying to the substrate a wet composition comprising calcium carbonate, and superabsorbent polymer that can absorb at least about 50 times its mass and having a particle size of about 250 microns or less, wherein the composition is substantially free of a setting-type cementitious material, and allowing the composition to dry on the substrate.

In another embodiment, the substrate is in the form of wallboard, plaster wall, concrete walls, or a ceiling.

In another embodiment, the composition is applied by spraying.

In another embodiment, the composition is applied by stippling.

In another embodiment, the composition is applied by roll-on such as by a paint roller.

In another embodiment, the composition is applied by paintbrush.

It shall be noted that the preceding are merely examples of embodiments. Other exemplary embodiments are apparent from the description herein. It will also be understood by one of ordinary skill in the art that each of these embodiments may be used in various combinations with the other embodiments provided herein.

The following examples further illustrate the invention but, of course, should not be construed as in any way limiting its scope.

In the examples, the amount of foam in pot defoaming indicates the relative amount of foam generated when the mix container is washed with water. Pot defoaming speed indicates the visual rate at which the foam breaks down when the mix container is washed with water. Craters indicate the surface deformation of spray droplets when the texture spatters impact on the substrate. Dripping/running indicates the tendency for the texture spatters to sag and flow together. Lumps, gel balls and nits indicate undispersed particles of the texture mixture that are deposited on the sprayed surface. Standout indicates the three dimensional relief or spatter definition between the sprayed droplets and the background paint. Spatter "look" indicates the visual appearance of the spray droplets. Spatter size indicates the relative size of the spray droplets. Knockdown "look" indicates the visual appearance of the spatters when slightly flattened using a trowel. Pattern uniformity over joint indicates the overall appearance of the sprayed texture, having little or no variation. Hardness indicates the strength of the bond between the applied texture and wall surface.

EXAMPLE 1

This example demonstrates a "dry" formulation of a texture composition according to the invention ("sample 1"), and also provides a comparison of properties between sample 1 relative to a control composition of USG's dry TUF-TEX® product (control 1), which contained cellulosic thickener and defoamer, and excluded super absorbent polymer.

In the example, final water indicates the total amount of water required to mix the texture at the desired viscosity. Final viscosity indicates the viscosity measurement of the texture when mixed at the desired water ratio.

Table 3A provides the formulation of sample 1. The listed ingredients were put into a mixer and dry blended. Weights provided herein are in grams unless otherwise indicated.

TABLE 3A

| Ingredient | Sample 1 |
|---|---|
| Calcium Carbonate (Dolocron 4512A—Specialty Minerals) | 440.22 |
| Calcium Carbonate (Picqua P-100—Picqua) | 440.22 |
| Kaolin Clay (ASP 600-BASF Corporation) | 25.01 |
| Mica (GIM Mica—Georgia Industrial Minerals) | 50.03 |
| Attapulgite Clay (Minugel FG—Active Minerals International, LLC) | 25.01 |
| Super Absorbent Polymer (Water Lock ® SAP C-200—Grain Processing Corporation) | 1.50 |
| Wheat Starch (Genvis 200D—Archer Daniels Midland) | 15.01 |
| Guar Gum (Galactasol 60H3FDS—Ashland Chemicals) | 2.50 |
| Preservative Biocide (Vancide MZ-96—RT Vanderbilt) | 0.50 |
| Total Weight | 1000.00 |

Table 3B shows a comparison of properties between control 1 and representative sample 1. Two rating scales are incorporated into Table 3B. One rating scale is in the following order: zero, nil, trace, slight, moderate, or considerable. The other rating scale is from 1-5, with 5 being the best.

TABLE 3B

|  | Control 1 | Sample 1 |
|---|---|---|
| Final Water | 775 | 795 |
| Final Viscosity (Brabender units) | 195 | 190 |
| Amount of Foam in Pot Defoaming | Considerable | Nil |
| Pot Defoaming Speed | Slow | Very Fast |
| Craters | Zero | Trace |
| Dripping/Running | Considerable | Nil |
| Lumps, Gel Balls, Nits | Zero | Zero |
| Standout | 4 | 3.5 |
| Spatter "Look" | 3 | 2.5 |
| Spatter Size | Large | Medium |
| Knockdown "Look" | 3 | 2.5 |
| Pattern Uniformity Over Joint | 3 | 3.5 |
| Hardness | 4 | 4 |

Upon addition of water, control 1 displayed a heavy, gummy feel. Control 1 had good flow, and had air bubbles in the aqueous mix, did not wash off easily, had considerable pot foam and exhibited considerable dripping.

This example shows the effectiveness of a texture composition comprising superabsorbent polymer relative to control. Sample 1 excluded cellulosic thickener and defoamer, and also had a reduced amount of clay and starch. Sample 1 did not result in as much air entrainment upon addition of water, as not as many air bubbles were seen. Sample 1 also did not suffer from as much dripping as the control. Sample 1 also washed off easier, had a less heavy but creamy feel, and was smooth and silky.

EXAMPLE 2

This example demonstrates a "ready-mixed" formulation of a texture composition 2 according to the invention ("sample 2"), and also provides a comparison of properties between sample 2 and control 2, which was a sample of USG's ready-mixed TUF-TEX® product. Control 2 contained cellulosic thickener and did not include super absorbent polymer.

In the example, initial Brabender viscosity (using the "A" pin style paddle) indicates the viscosity of the ready-mixed texture product. Final Brabender viscosity (using the "B" narrow double flag paddle) indicates the viscosity of the texture product when diluted to the desired consistency for application.

Table 4A provides the formulation of sample 2.

TABLE 4A

| Ingredient | Sample 2 |
|---|---|
| Calcium Carbonate (Hubercarb M200—JM Huber Corporation) | 6596.7 |
| Attapulgite Clay (Minugel FG—Active Minerals International, LLC) | 100.0 |
| Mica (P80-F Mica—USG) | 450.0 |
| Wheat Starch (Genvis 200D—Archer Daniels Midland) | 40.0 |
| Guar Gum (Galactasol 40H4FDS-1—Ashland Chemicals) | 9.0 |
| Dry Powder Polyvinyl Alcohol (Celvol 205-S—Celanese) | 5.5 |
| Super Absorbent Polymer (Water Lock ® SAP C-200—Grain Processing Corporation) | 3.8 |
| Magnesium Hydroxide | 11.0 |
| Defoamer (Hi Mar D829—Hi-Mar Specialty Chemicals) | 2.0 |
| Defoamer (Hi Mar D827—Hi-Mar Specialty Chemicals) | 2.0 |
| Biocide (Nuosept 91—Ashland Specialty Ingredients) | 9.5 |
| Amount Water | 3267.6 |
| Percent Water | 31.13% |
| Total Weight | 10497.1 |

Table 4B shows a comparison of properties between control 2 and representative sample 2. Two rating scales are incorporated into Table 4B. One rating scale is in the following order: zero, nil, trace, slight, moderate, or considerable. The other rating scale is from 1-5, with 5 being the best.

TABLE 4B

|  | Control 2 | Sample 2 |
|---|---|---|
| Initial Brabender Viscosity | 500 | 530 |
| Final Brabender Viscosity | 245 | 245 |
| Amount of Foam in Pot defoaming | Slight | Trace |
| Pot Defoaming Speed | Very Fast | Very Fast |
| Craters | Nil | Slight |
| Dripping/Running | Trace | Trace |
| Lumps, Gel Balls, Nits | Zero | Zero |
| Standout | 3 | 3 |
| Spatter "Look" | 3.5 | 3 |
| Spatter Size | Medium | Small |
| Knockdown "Look" | 4 | 4 |
| Pattern Uniformity Over Joint | 3.5 | 4 |
| Hardness | 3.5 | 1.5 |

This example shows the effectiveness of a texture composition (sample 2) comprising superabsorbent polymer relative to control 2. Advantageously, sample 2 was useful even with cellulosic thickener excluded. Relative to control 2, sample 2 also advantageously had a reduced amount of clay, mica, starch, guar gum, and defoamers. Control 2 was much stickier and harder to wash off hands and tools than sample 2.

It is noted that the weight percentages recited herein throughout are based on dry composition (i.e., prior to addition of water by end user or in a ready-mixed composition) unless otherwise indicated.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A texture composition for texturing a substrate comprising:
   (a) non-setting mineral;
   (b) superabsorbent polymer that can absorb at least about 50 times its mass, and having a particle size of about 250 microns or less; and
   (c) water,
   wherein the texture composition is substantially free of a setting type cementitious material, wherein the composition hardens upon drying,
   and wherein the texture composition has a viscosity of from about 150 to about 800 Brabender units.

2. The composition of claim 1, wherein the non-setting mineral is calcium carbonate.

3. The composition of claim 1, wherein the superabsorbent polymer has a particle size of about 150 microns or less.

4. The composition of claim 2, wherein the superabsorbent polymer can absorb from about 200 to about 800 times its mass.

5. The composition of claim 1, wherein the superabsorbent polymer is present in an amount from about 0.02% to about 5% by weight of the composition.

6. The composition of claim 1, wherein the superabsorbent polymer is prepared from the polymerization of acrylic acid blended with sodium hydroxide in the presence of an initiator to form a poly-acrylic acid sodium salt.

7. The composition of claim 1, wherein the superabsorbent polymer is made from polyacrylamide copolymer, ethylene maleic anhydride copolymer, cross-linked carboxy-methyl-cellulose, polyvinyl alcohol copolymers, cross-linked polyethylene oxide, or starch grafted copolymer of polyacrylonitrile.

8. The composition of claim 1, wherein the composition is substantially free of cellulosic thickener.

9. The composition of claim 1, wherein the composition is substantially free of oligosaccharide, polysaccharide, cellulosic ether, cellulose-based gum, methyl cellulose, hydroxyethyl cellulose, hydroxyethylmethyl cellulose, dextran, carboxymethyl dextran, dextran-sulfonate salt, chitosan, xanthan gum, carboxymethyl cellulose or a salt thereof, carrageenan, hydroxyethylhydroxypropyl cellulose, ethylhydroxyethyl cellulose, hydroxypropylmethyl cellulose, and methylhydroxylpropyl cellulose.

10. The composition of claim 1, wherein the composition further comprises starch.

11. The composition of claim 10, wherein the starch comprises pregelatinized starch, acid modified starch, or alkylated starch.

12. The composition of claim 10, wherein the starch comprises corn starch, potato starch, wheat starch, modified corn starch, pregelatinized wheat starch, native wheat starch, modified wheat starch, hydroxyethylated dent corn starch, hydroxypropylated cross-linked dent corn starch, hydroxypropylated cross-linked waxy corn starch or modified potato starch.

13. A texture composition for texturing a substrate consisting essentially of:
   (a) calcium carbonate in an amount from about 30% to about 95% by weight of the composition;
   (b) superabsorbent polymer that can absorb at least about 50 times its mass, and having a particle size of about 250 microns or less, wherein the superabsorbent polymer is in an amount from about 0.02% to about 5% by weight of the composition; and
   (c) starch; and
   (d) water,
   wherein the composition hardens upon drying, and wherein the texture composition has a viscosity of from about 150 to about 800 Brabender units.

14. A method of texturing a substrate comprising:
   (a) applying to the substrate the composition according to claim 1; and
   (b) drying the composition on the substrate to harden the composition.

15. The method of claim 14, wherein the substrate is in the form of wallboard, plaster wall, concrete walls, or ceiling.

16. The method of claim 14, wherein the composition is applied by spraying, roll-on, stippling, paint roller, or paintbrush.

17. The method of claim 14, wherein the superabsorbent polymer is prepared from the polymerization of acrylic acid blended with sodium hydroxide in the presence of an initiator to form a poly-acrylic acid sodium salt.

18. The method of claim 14, wherein the superabsorbent polymer is made from polyacrylamide copolymer, ethylene maleic anhydride copolymer, cross-linked carboxy-methyl-cellulose, polyvinyl alcohol copolymers, cross-linked polyethylene oxide, or starch grafted copolymer of polyacrylonitrile.

19. The method of claim 14, wherein the composition is substantially free of cellulosic thickener.

\* \* \* \* \*